US012680836B2

(12) United States Patent
Whiddon et al.

(10) Patent No.: US 12,680,836 B2
(45) Date of Patent: Jul. 14, 2026

(54) NORMAL INTERFACE SURFACE MATING SENSOR

(71) Applicant: RTX Corporation, Farmington, CT (US)

(72) Inventors: Ronald J. Whiddon, Hartford, CT (US); Daniel James Graves, Amston, CT (US); Melanie E. Tibbetts, Portland, CT (US); Eli Warren, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 183 days.

(21) Appl. No.: 18/595,814

(22) Filed: Mar. 5, 2024

(65) Prior Publication Data

US 2025/0283735 A1    Sep. 11, 2025

(51) Int. Cl.
 G01D 5/165 (2006.01)
 G01D 11/30 (2006.01)
(52) U.S. Cl.
 CPC .................................... G01D 5/165 (2013.01)
(58) Field of Classification Search
 CPC ..... G01D 5/165; G01D 11/30; G01N 15/0266
 See application file for complete search history.

(56) References Cited

U.S. PATENT DOCUMENTS

| | | | |
|---|---|---|---|
| 6,478,565 B2 | 11/2002 | Woodmansee et al. | |
| 8,742,944 B2 | 6/2014 | Mitchell et al. | |
| 10,507,914 B2 | 12/2019 | Walker et al. | |
| 11,614,355 B2 | 3/2023 | Ankney | |
| 2006/0202359 A1* | 9/2006 | Chen | G01B 7/30 |
| | | | 257/E23.179 |
| 2007/0063771 A1 | 3/2007 | Pan et al. | |
| 2008/0024122 A1* | 1/2008 | Desbiolles | G01D 5/24419 |
| | | | 324/207.25 |
| 2010/0072988 A1* | 3/2010 | Hammerschmidt | G01D 5/142 |
| | | | 324/207.25 |
| 2011/0241708 A1 | 10/2011 | Chen | |
| 2014/0278224 A1* | 9/2014 | Trontelj | G01B 7/30 |
| | | | 702/151 |
| 2015/0333453 A1 | 11/2015 | Franke et al. | |
| 2018/0172423 A1* | 6/2018 | Ausserlechner | G01B 7/003 |
| 2024/0060423 A1* | 2/2024 | Black | F01D 11/122 |

OTHER PUBLICATIONS

European Search Report dated Sep. 9, 2025, in connection with European Application No. 25161924.3, 11 pages.

* cited by examiner

*Primary Examiner* — Giovanni Astacio-Oquendo
*Assistant Examiner* — Temilade S Rhodes-Vivour

(57) ABSTRACT

A normal interface surface mating sensor includes a power source, a plurality of electrically conductive sensing elements, and at least one of an ammeter or a voltmeter. The voltmeter is connected in parallel with the first terminal and the second terminal of the power source. The plurality of electrically conductive sensing elements is coupled to the first terminal of the power source, is arranged on a first contact face in a pattern such that a spatial location of each sensing element generates an electrical signal when a conductive area on an opposing contact face physically contacts the first contact face at the spatial location of the sensing element contacted. Measurements from the ammeter and the voltmeter together are output as a contact event indicator that includes a conductivity measurement corresponding to the electrical signal generated by the physical contact at a sequence of the NISMSs contacted.

20 Claims, 13 Drawing Sheets

NORMAL INTERFACE SURFACE MATING SENSOR

TECHNICAL FIELD

This disclosure relates generally to a sensor for detecting contact between opposing faces that are subject to normal translation. More specifically, this disclosure relates to a normal interface surface mating sensor.

BACKGROUND

Tracking contact between components due to direct mechanical action or as a result of intrinsic geometric changes is valuable for validating proper component response or for detecting intermittent part interference, etc. Tracking contact events in extreme environments (thermal, fit, pressure or other) precludes the application of a component contact sensor assembly.

SUMMARY

This disclosure relates to a normal interface surface mating sensor.

In a first embodiment, an apparatus that includes a power source, a plurality of electrically conductive sensing elements, and at least one of an ammeter or a voltmeter. The power source includes a first terminal and a second terminal. The ammeter is connected to the first terminal of the power source to measure electrical current at the first terminal. The voltmeter is connected in parallel with the first terminal and the second terminal of the power source to measure voltage across the power source. The plurality of electrically conductive sensing elements is coupled to the first terminal of the power source. The plurality of electrically conductive sensing elements is positioned on a first contact face of a surface of an external first body, flush with the first contact face. The plurality of electrically conductive sensing elements is arranged in a pattern such that a spatial location of each sensing element among the plurality of electrically conductive sensing elements forms a normal interface surface mating sensor (NISMS) that generates an electrical signal when a conductive area on an opposing contact face of an external second body physically contacts the first contact face of the external first body at the spatial location of the NISMS. The measurements from the at least one of the ammeter or the voltmeter are output as a contact event indicator that includes a conductivity measurement corresponding to the electrical signal generated by the physical contact at a sequence of the NISMSs with the conductive area on opposing contact face.

In a second embodiment, a method includes providing a power source including a first terminal and a second terminal. The method includes providing at least one of: an ammeter connected to the first terminal of the power source to measure electrical current at the first terminal; or a voltmeter connected in parallel with the first terminal and the second terminal of the power source to measure voltage across the power source. The method includes providing a plurality of electrically conductive sensing elements coupled to the first terminal of the power source and positioned on a first contact face of a surface of an external first body, flush with the first contact face, and arranged in a pattern such that a spatial location of each sensing element among the plurality of electrically conductive sensing elements forms a normal interface surface mating sensor (NISMS) that generates an electrical signal when a conductive area on an opposing contact face of an external second body physically contacts the first contact face of the external first body at the spatial location of the NISMS. The method includes outputting the measurements from the at least one of the ammeter or the voltmeter as a contact event indicator that includes a conductivity measurement corresponding to the electrical signal generated by the physical contact at a sequence of the NISMSs with the conductive area on opposing contact face.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 7 illustrates a front view of a sensing element and an abradable resistive element of an NISMS that detects a contact event and face wear from a conductive second body, according to this disclosure;

FIG. 8 illustrates a front view of a sensing element and an abradable resistive element of an NISMS that detects a contact event and face wear from a non-conductive second body, according to this disclosure.

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Existing contact sensing measurements rely on detecting an applied pressure between contacting surfaces, a distance measurement between contact pairs (e.g., two bodies that contact each other), or a mechanical interaction between contact pairs applied to a discrete contact sensing mechanism (e.g., mechanical switch sensors). The distance measurements between contact pair can be detected using reflectometry techniques and proximity sensors that are inductive, capacitive, or magnetic.

One of the benefits of a normal interface surface mating sensor (NISMS) is that a measurement ("NISMS measurement") is a direct indication of contact (e.g., a detection event) between contact faces of interest (e.g., being monitored) that are located in the area of the sensing element. The function of the NISMS is similar to a switch based contact sensor. However, the mechanical action that closes the electrical circuit within the NISMS is not caused by a secondary mechanical linkage, rather the direct physical interaction of the contact faces of interest being measured. The size of the contact element within the NISMS can be defined dependent on the lead size, and can even be so small as to be a direct deposition lead on an isolating substrate.

Figure 1:
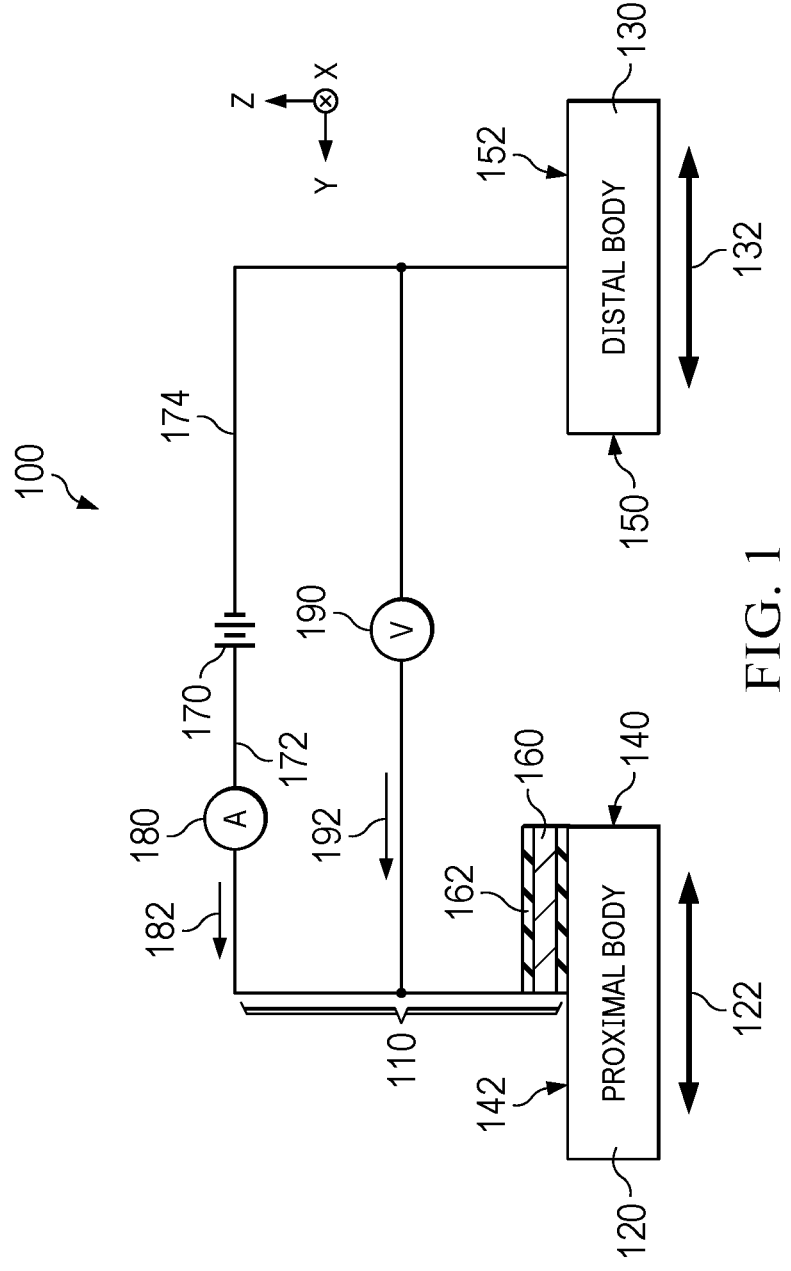
FIG. 1 illustrates an example system that includes a normal interface surface mating sensor (NISMS) and two bodies monitored by the NISMS according to this disclosure.

FIG. 1 illustrates a system 100 that includes a normal interface surface mating sensor (NISMS) 110 and two bodies 120 and 130 monitored by the NISMS 110 according to this disclosure. The embodiment of the system 100 shown in FIG. 1 is for illustration only, and other embodiments could be used without departing from the scope of this disclosure.

In a particular use case scenario, the first and second bodies 120 and 130 are components of an engine and are confined in a small space that is too small to add contact monitoring equipment or inaccessible for other external measurement. The external surface of the first body 120 includes multiple faces including a first contact face 140, which can be as a right-side face in an x-z plane according to the coordinate system shown in FIG. 1. The external surface of the second body 130 includes multiple faces including a second contact face 150, which can be as a left-side face in an x-z plane according to the coordinate system shown. The two contact faces 140 and 150 can be spaced apart by a gap and face each other. The two contact faces 140 and 150 are subject to normal translation, for example along the y-axis, as the arrows of movement 122 and 132 show. In other words, a vector of relative motion between the two bodies 120 and 130 is normal (e.g., orthogonal) to the two contact faces 140 and 150. Movement 122 of the first body 120 can expand or shrink the gap that defines a separation distance between the two contact faces 140 and 150. Analogously, movement 132 of the second body 130 can expand or shrink the gap. In this engine scenario, the first and second bodies 120 and 130 are structures are not expected to maintain constant physical contact with each other during normal operation, but can in fact physically contact each other. An owner of the engine or personnel of an operations and maintenance team might desire to know when the first and second bodies 120 and 130 physically contact, or more specifically, when the first and second contact faces 140 and 150 physically contact each other. The two contact faces 140 and 150 can have dimensions that are substantially the same, such that when the two contact faces 240 and 250 are parallel aligned without (angular or offset) misalignment, the entire area of the first contact face 140 is flush in physical contact with the entire area of the second contact face 150. Note that while an engine-based scenario is specifically described as one type of example use case of the NISMS 110, the NISMS 110 can be used in any suitable applications (e.g., use cases) in any suitable environments.

Figure 8:
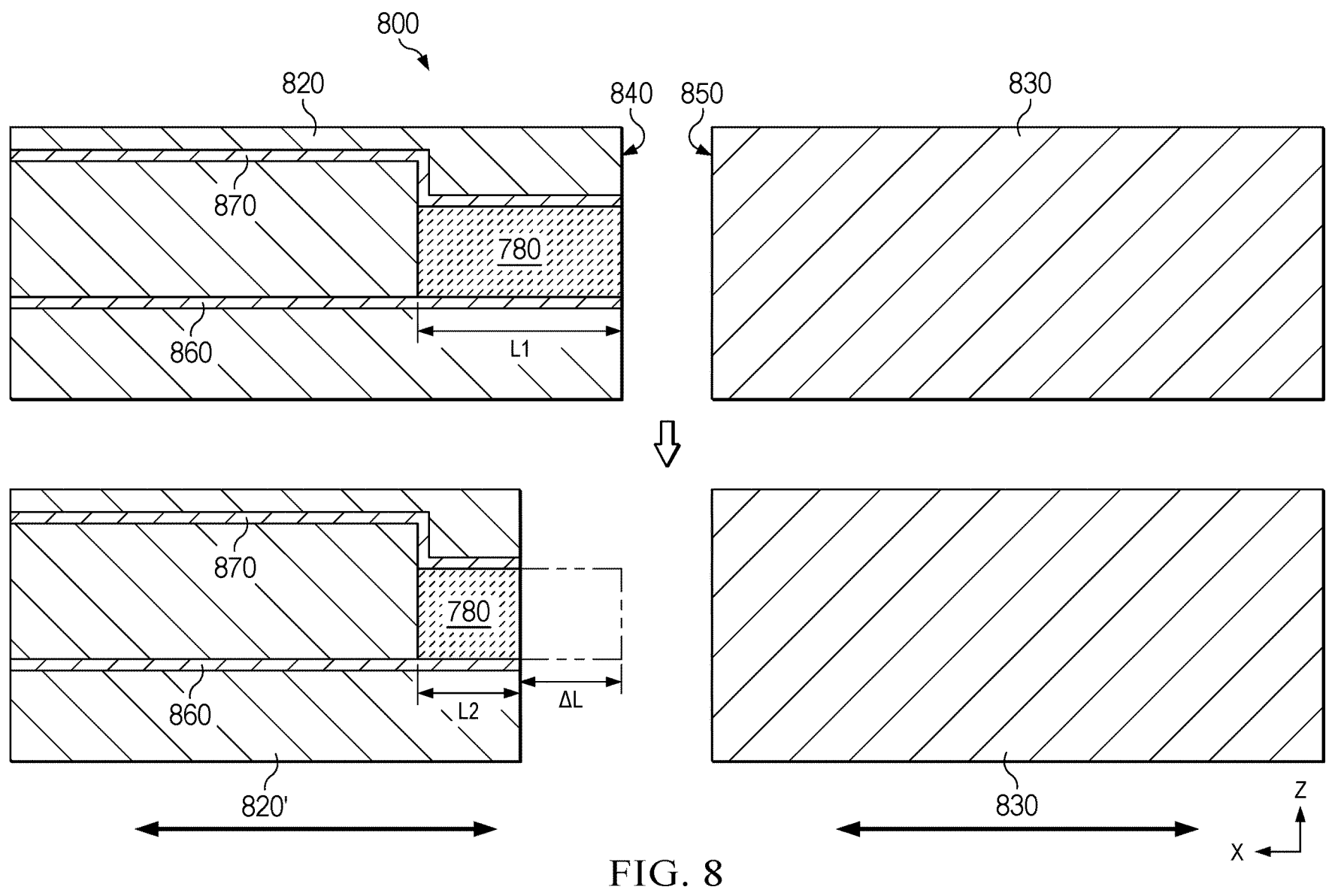

The first body 120 can be electrically conductive or non-conductive, as embodiments of this disclosure are independent from the conductivity of material of the first body 120. In the system 100, and the second body 130 is electrically conductive, for example, composed of metal or other electrically conductive material. However, the second body can be non-conductive in a different system (other than system 100) in a different embodiment of this disclosure, as shown in FIG. 8.

Figures 3A, 3B, 3C:
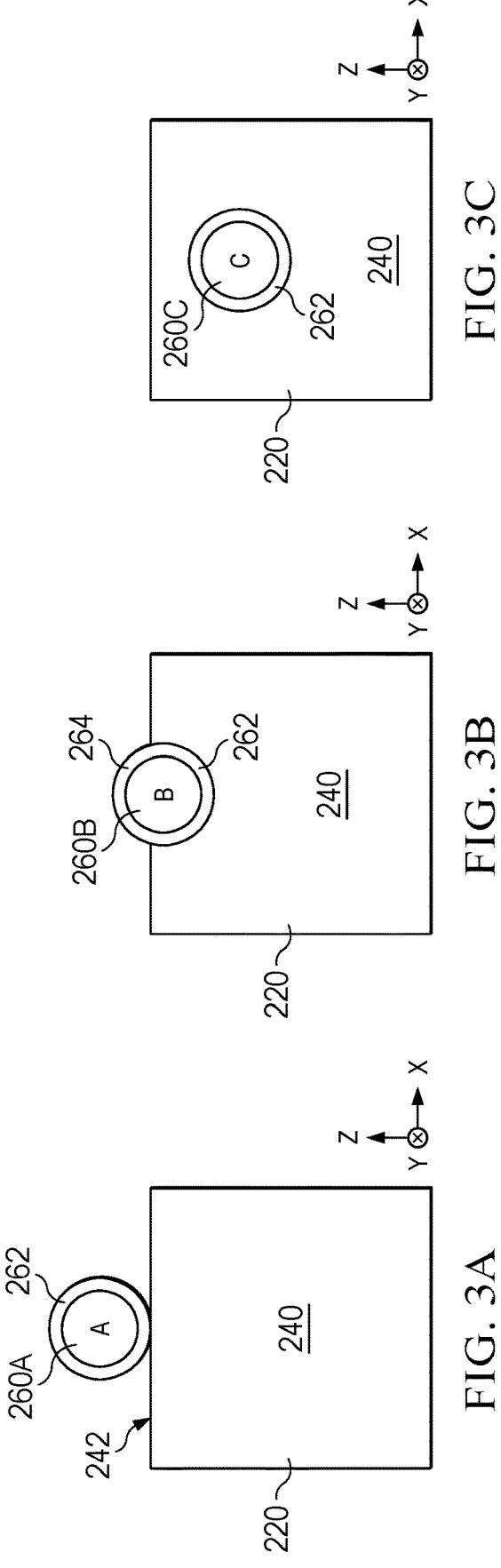
FIGS. 3A, 3B, and 3C respectively illustrate a side view of the surface mounted, entrenched, and embedded positions of the multiple sensing elements relative to the first body of FIG. 2A, according to this disclosure.

The system 100 is an embodiment in which the NISMS 110 is a device to be installed into a position relative to an external device (e.g., engine), and the external device includes the first body 120 and second body 130. That is, the NISMS 110 can be installed into a position relative to the two bodies 120 and 130 that enables the NISMS 110 to detect a contact event that includes two contact faces 140 and 150 in physical contact. Also, the position where the NISMS 110 is installed enables (e.g., does not interfere with or influence) movements 122 and 132 of two bodies 120 and 130, respectively. In a different system (other than system 100) in a different embodiment of this disclosure, the NISMS 110 can be integrated into with the first body, with the second body, or with both bodies of a device (e.g., engine) that the NISMS 110 monitors, as shown in FIGS. 3B and 3C.

The NISMS 110 is composed of an electrically isolated (i.e., electrically isolated from the first body 120) sensing element 160 embedded in or otherwise attached to a body (for example, the first body 120) such that the sensing element 160 is flush, recessed or proud of a proximal face (e.g., first contact face 140) of the body anticipated to make contact with a mating face (e.g., second contact face 150). An electric insulator 262, which is composed from one or more electric insulator materials that have high resistivity and prevent the flow of electric current, is disposed between the sensing element 160 and the surface of the first body 120, and can surround the surface of the sensing element 160 except for areas of the electric insulator 262 that face the second contact face 150 of the second body 130. The sensing element 160 is electrically conductive, such as a conductive probe. The sensing element 160 is a single electrical node in the system 100, but can include multiple electrical nodes in a different embodiment of this disclosure, as shown in FIGS. 2 and 4-6.

The NISMS 110 includes a power source (battery) 170 that includes a first terminal 172 and a second terminal 174. The NISMS 110 additionally includes an ammeter 180 and/or a voltmeter 190. The battery 170 and the voltmeter 190 are connected in an electric parallel circuit, and the voltmeter 190 measures voltage (i.e., electrical potential) between the first and second terminals 172 and 174. The first terminal 172 of the battery 170 is electrically connected to the sensing element 160, and the ammeter 180 measures electrical current at the first terminal 172. In the system 100, the second terminal 174 of the battery 170 is electrically connected to the second body 130. For example, the second terminal 174 can be physically and electrically coupled to the top face 152 of the second body 130.

The NISMS 110 detects when the first contact face 140 and the second contact face 150 are in physical contact, which physical contact is primarily due to the movement 122, 132 of opposing body faces in a vector normal to the respective faces (i.e., a closing of the gap between the contact faces 140 and 150). In the system 100, the sensing element 160 is surface mounted at a position on an outer surface of the first body 120, for example, a top face 142 of the first body 120 in an x-y plane according to the coordinate system shown in FIG. 1. The position of the sensing element 160 is flush with (the plane of) the contact face 140. That is, the sensing element 160 can be surface mounted onto any outer surface of the first body 120, so long as the sensing element 160 switches into closed-circuit electrical contact with the second terminal 174 of the battery 170 upon physical contact between the two contact faces 140 and 150. Various embodiments of this disclosure change the position of the sensing element 160 relative to the first body 120 or change the shape of the sensing element 160, however, the positioning of the sensing element 160 remains such that the contact of a proximal face to a distal face will result in an electrically conductive contact being made between sensing element 160 and the distal face.

The second contact face 150 (e.g., distal face), upon contacting the sensing element 160, forms a completed circuit through electrical conduction through the second body 130 (i.e., distal body) of the system 100. In a different embodiment of this disclosure, the distal face, upon contacting the sensing element 160, forms a completed circuit through a provisioned return path applied to the distal face and distal body, for example, as shown in FIG. 2A.

The NISMS 110 detects a contact event based on a change in resistance in the sensing circuit, such as through a resistance change in the circuit. Continuity between the sensing element 160 and the second body 130 changes the sensor measurements indicated as potential (V) of the circuit, as load (A) of the circuit, or as both voltage and current (V and A) of the circuit. That is, embodiments of this disclosure do not require a combined use of the ammeter and the voltmeter, as either is sufficient to indicate an anticipated change in the circuit caused upon contact at the sensing element 160. It is understood that some embodiments of this disclosure, both the ammeter and the voltage meter used together (e.g., concurrently) to generate the sensor measurements changed, which indicate change in the circuit caused upon contact at the sensing element 160. Another way that the NISMS 110 detects the contact event is based on a change in an externally applied potential as the circuit alternates between electrically open state and electrically open closed states. A current measurement output 182 from the ammeter 180 with a voltage measurement output 192 from the voltmeter 190 can be used to measure the change in resistance (e.g., a conductivity change) in the sensing circuit, for example, the resistance change can be relative to a reference resistance value. Particularly, the ammeter 180 and voltmeter 190 can measure a direct or an alternating electric current.

Figure 2A:
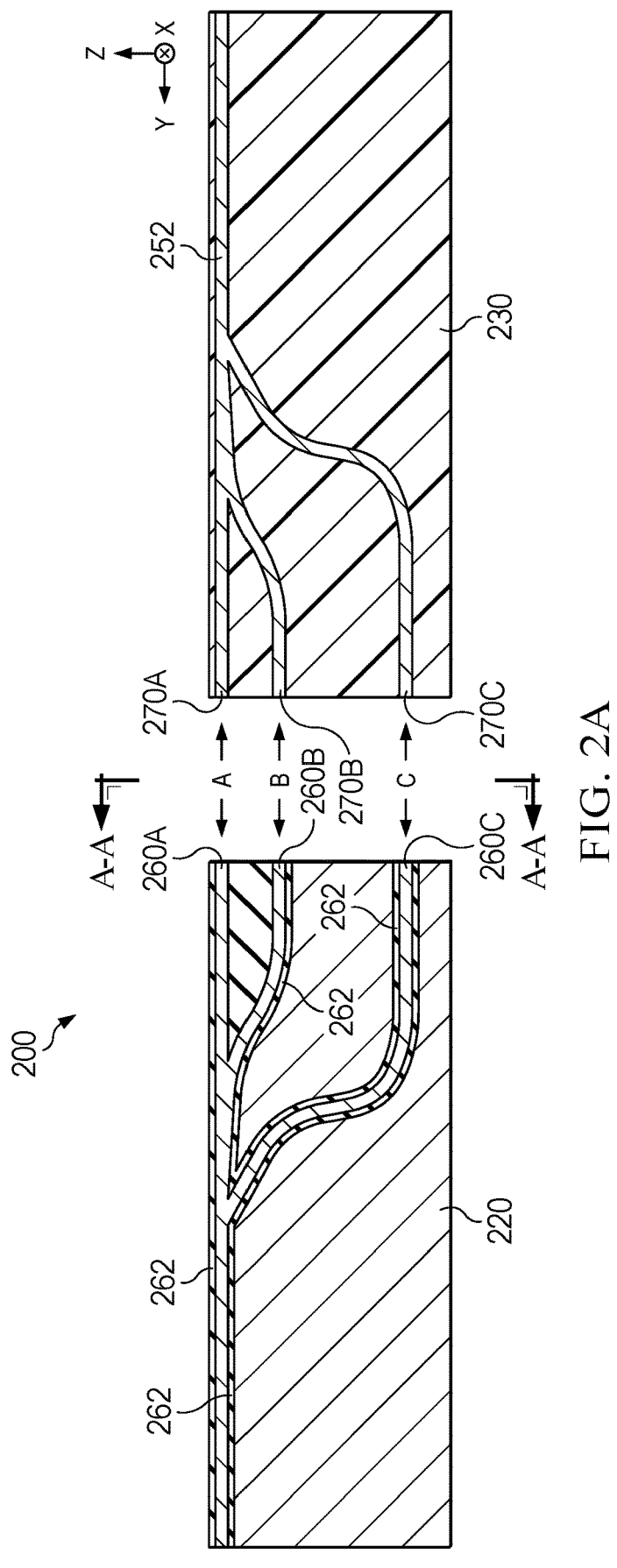
FIG. 2A illustrates a front view of multiple sensing elements that mate with multiple corresponding return elements of an NISMS that are surface mounted on, entrenched in, and embedded within two bodies, respectively, according to this disclosure.

FIG. 2A illustrates a front view of multiple sensing elements 260a-260c that mate with multiple corresponding return elements 270a-270c of an NISMS that are surface mounted on, entrenched in, and embedded within two bodies, respectively, according to this disclosure. As shown in FIG. 2A, a system 200 includes a first body 220 and a non-conductive second body 230. The first body 220 can be the same as or similar to the first body 120 of FIG. 1. The second body 230 is composed of a non-conductive material that is different from the conductive material of which the second body 130 of FIG. 1 is composed, but otherwise can be similar to the second body 130.

Figure 2B:
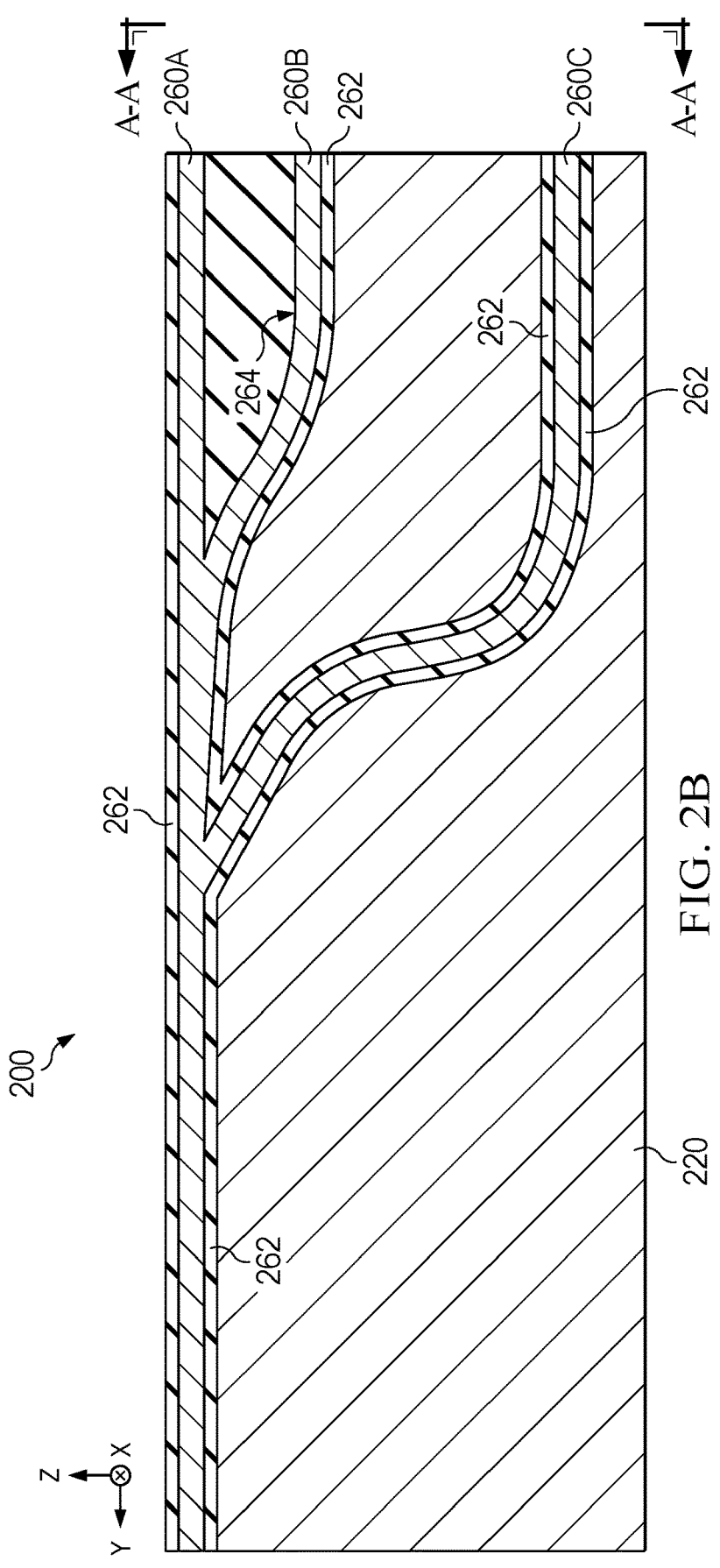
FIG. 2B illustrates a portion of FIG. 2A enlarged to show a close up view of the multiple sensing elements electrically isolated from the first body of FIG. 2A.

FIG. 2B illustrates a portion of FIG. 2A enlarged to show a close up view of the multiple sensing elements 260A-260C electrically isolated from the first body 220 by an electric insulator 262 of FIG. 2A. The electric insulator 262 can be similar to and can perform the same function as the electric insulator of 162 of FIG. 1.

In the system 200, a first pair of mating elements (labeled A) includes a first sensing element 260A that is adapted to mate (i.e., mates with) a corresponding first return element 270A. A second pair of mating elements (labeled B) and a third pair of mating elements (labeled C) include a second and a third sensing element 260B and 260C that are adapted to mate with a corresponding second and third return element 270B and 270C, respectively. When the two contact faces 240 and 250 of the two bodies are parallel aligned without (angular or offset) misalignment, each of the pairs of mating elements A, B, and C is mated such that a face of the sensing element is in physical contact with an opposing face of the corresponding return element, for example, with opposing faces flush to each other. In some embodiments, a pair of mating elements (A, B, or C) have a female-male shapes such that one among the pair of mating elements has a recessed female shape and the other among the pair of mating elements has a protruded male shape corresponding to the recessed female shape. The female and male shapes of the pair of mating elements physically contact and are mated when the two contact faces 240 and 250 are parallel aligned without (angular or offset) misalignment.

FIGS. 3A, 3B, and 3C respectively illustrate a side view of the surface mounted, entrenched, and embedded positions of the multiple sensing elements relative to the first body 220 of FIG. 2A, according to this disclosure. The side view is from the point of view of the cutting plane line A-A shown in FIG. 2A.

The first sensing element 260A is surface mounted on the outer surface of the first body 220, for example, on a top face 242 of the first body 220 as shown in FIG. 3A. With a mirror-image similarity, the first return element 270A is surface mounted on the outer surface of the second body 230, for example, on a top face 252 of the second body 230.

The second sensing element 260B is entrenched in the first body 220, as shown in FIG. 3B. For example, the outer surface of the first body 220 can include a groove, and the second sensing element 260B can be installed into the groove to fill the groove. After installed within the groove, a portion of the second sensing element 260B is faces the groove and is positioned internal to the groove, another portion 264 of the second sensing element 260B is exposed outside of the groove and protrudes (e.g., in a direction along the z-axis) beyond the surface of the first body 220 to be exposed outside of the first body 220. For example, the second sensing element 260B can be a lead (such as a lead on a printed circuit board) formed integral with the first body 220 and into the groove, or can be formed separate from the first body 220 and later inserted into the groove of the first body 220.

The third sensing element 260C is embedded within the first body 220, As shown in FIG. 3C. That is, third sensing element 260C is formed integrally with the first body 220, and is positioned internal to the first body 220. An inner surface of the electric insulator 262 surrounds the third sensing element 260C. An outer surface of the electric insulator 262 is surrounded by and is positioned internal to the first body 220, to electrically isolate the third sensing element 260C from the first body 220.

Figure 4A:
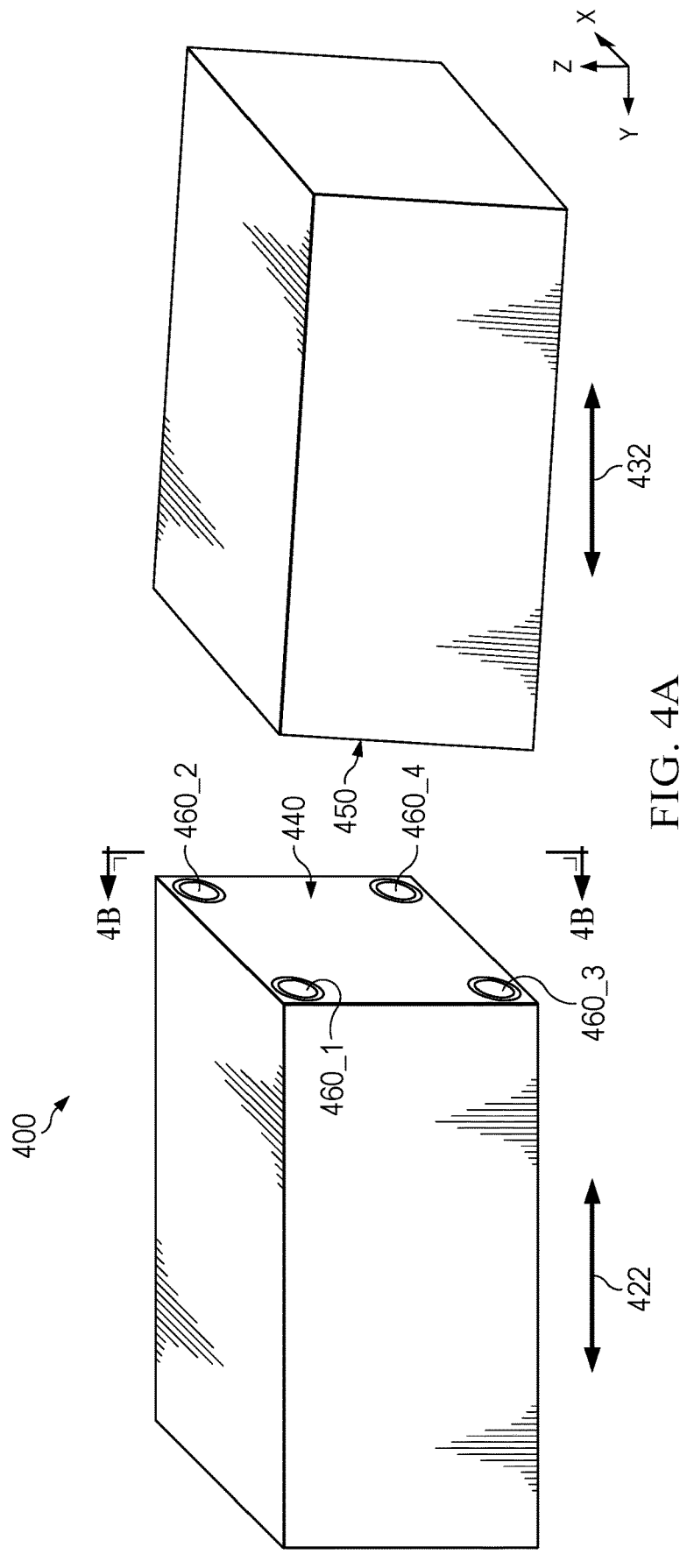
FIG. 4A illustrates an example system that includes an array of NISMSs that detect a contact event with angular misalignment from parallel, according to this disclosure.
Figure 4B:
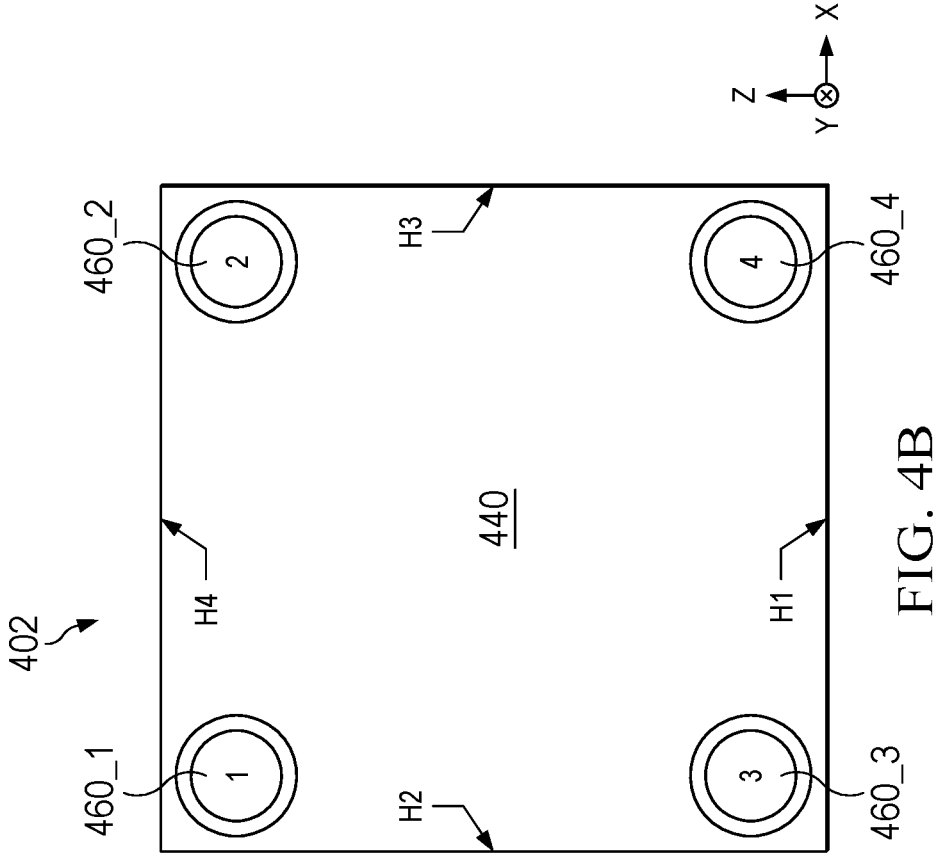
FIG. 4B illustrates an enlarged view of an array of sensing elements on a contact face of a first body within the system shown in FIG. 4A, according to this disclosure.

FIG. 4A illustrates an example system 400 that includes an array 402 of NISMSs that detect a contact event with angular misalignment from parallel, according to this disclosure. FIG. 4B illustrates an enlarged view of an array of sensing elements on a contact face of a first body within the system shown in FIG. 4A, according to this disclosure. FIGS. 4A and 4B are described together as FIG. 4. The array 402 of multiple sensing elements 460_1 through 460_4 is a component of an NISMS that detects a contact event with angular misalignment from parallel, according to this disclosure. As shown in FIG. 4, a system 400 includes a first body 420 and a non-conductive second body 430. The first body 420 and the second body 430 can be the same as or similar to corresponding components 120 and 130 of FIG. 1. The second body 430 is composed of an electrically conductive material. The two contact faces 440 and 450 are subject to normal translation, for example, along the y-axis, as the arrows of movement 422 and 432 show.

The multiple NISMS sensing elements 460_1 through 460_4 (generally, 460) are applied (e.g., in the pattern of the array) as the array 402 to one contact face (440 or 450) among a pair of contact faces 440 and 450. Two sensing elements 460 can be used to indicate a closure angle θ (e.g., angle of angular misalignment) between the opposing two contact faces 440 and 450.

The NISMS detects a contact event upon contact made between the two faces contact faces 440 and 450 at a single sensing element 460 or at multiple sensing elements 460 of the array 402 concurrently. That is, the arrayed sensing element 460 will conduct electricity in a closed circuit, indicting local contact event detected. The ammeter 180 and/or voltmeter 190 can measure the electricity conducted in the closed circuit, enabling the NISMS to detect the contact event.

The spatial location of the sensing elements 460 within the array 402 together with a sequence of the conductivity change within the NISMS causes the NISMS to qualitatively indicate an angular deviation from parallel between the contact face pair 440 and 450. For example, the conductivity change can be measured by and output from the ammeter and voltmeter of FIG. 1.

For example, the NISMS can qualitatively indicate an angular misalignment from parallel in a particular direction of rotation. For example, when the third and fourth sensing elements 460_3 and 460_4 conduct electricity in a closed circuit, the NISMS can indicate a rotation of the second contact face 450 about a first hinge line H1, which is formed based on the spatial location of the third and fourth sensing elements 460_3 and 460_4. In this example, the contact events detected concurrently at the third and fourth sensing elements 460_3 and 460_4 (while the remaining sensing elements 460_1 and 460_2 remain open circuited without detection of a contact event) cause the NISMS to output an indicator that the second face 450 is rotated about H1 and offset in the direction of the x-z plane. The table below shows that the NISMS can indicate angular misalignment in the particular direction of rotation about other hinge lines H2, H3, and H4, as shown in Table 1.

TABLE 1

| Plane of Angular Misalignment | Axis of Rotation | Contact Event Currently Detected? | | | |
|---|---|---|---|---|---|
| | | 460_1 | 460_2 | 460_3 | 460_4 |
| y-z | H1 | NO | NO | YES | YES |
| x-y | H2 | YES | NO | YES | NO |
| y-z | H3 | NO | YES | NO | YES |
| y-z | H4 | YES | YES | NO | NO |

The NISMS can include angular offset between the two contact faces 440 and 450 produces asynchronous continuity for sensing elements 460_1 through 460_4 as the faces make contact. By mapping continuous circuits for sensing elements, as shown in Table 1, a range of motion (ROM) relative angle of the pair of contact faces 440 and 450 can be determined based on which sequence of sensing elements 460_1 through 460_4 are conducting an electric signal.

Figure 5A:
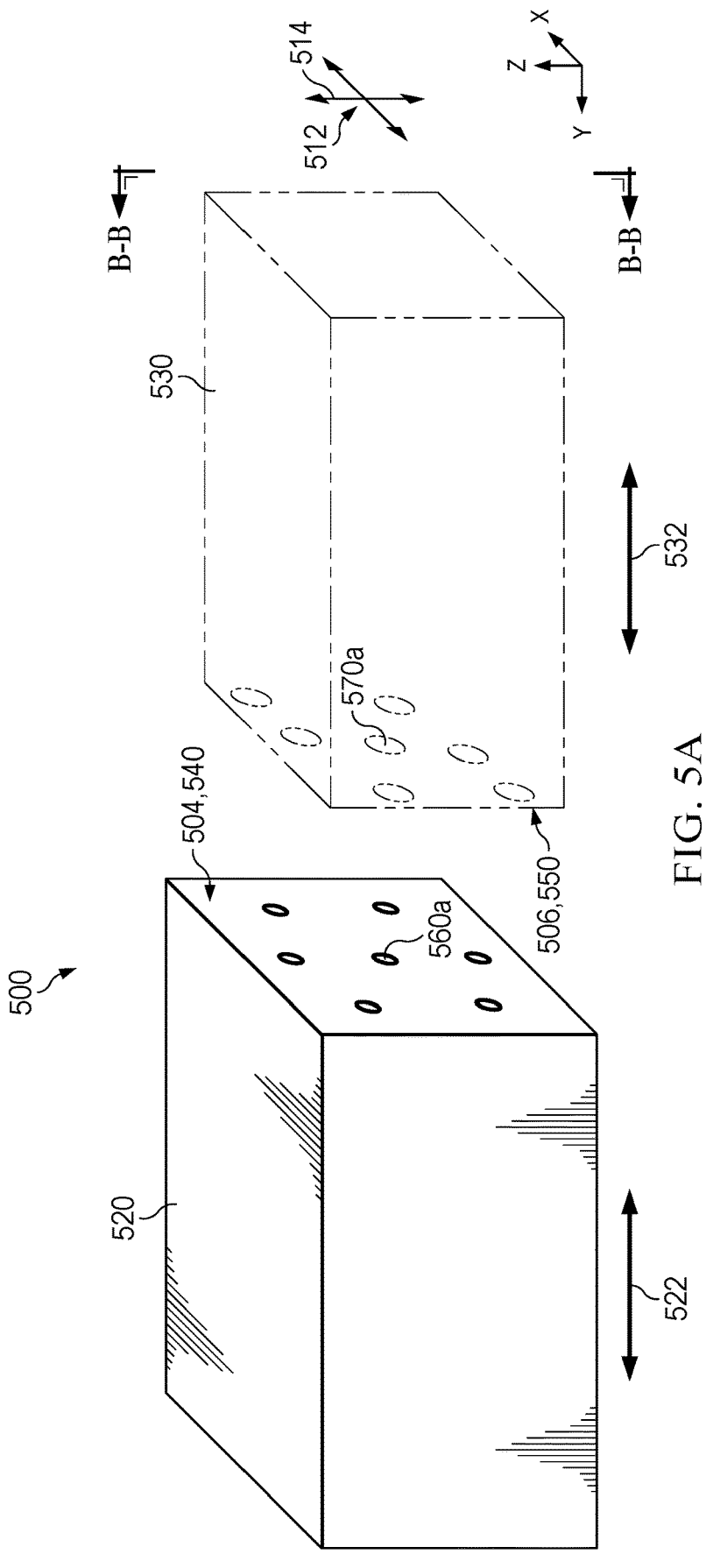
FIG. 5A illustrates an example system that includes an asymmetrical pattern of NISMSs that detect a contact event with orthogonal translation-induced offset misalignment from parallel, according to this disclosure.
Figure 5B:
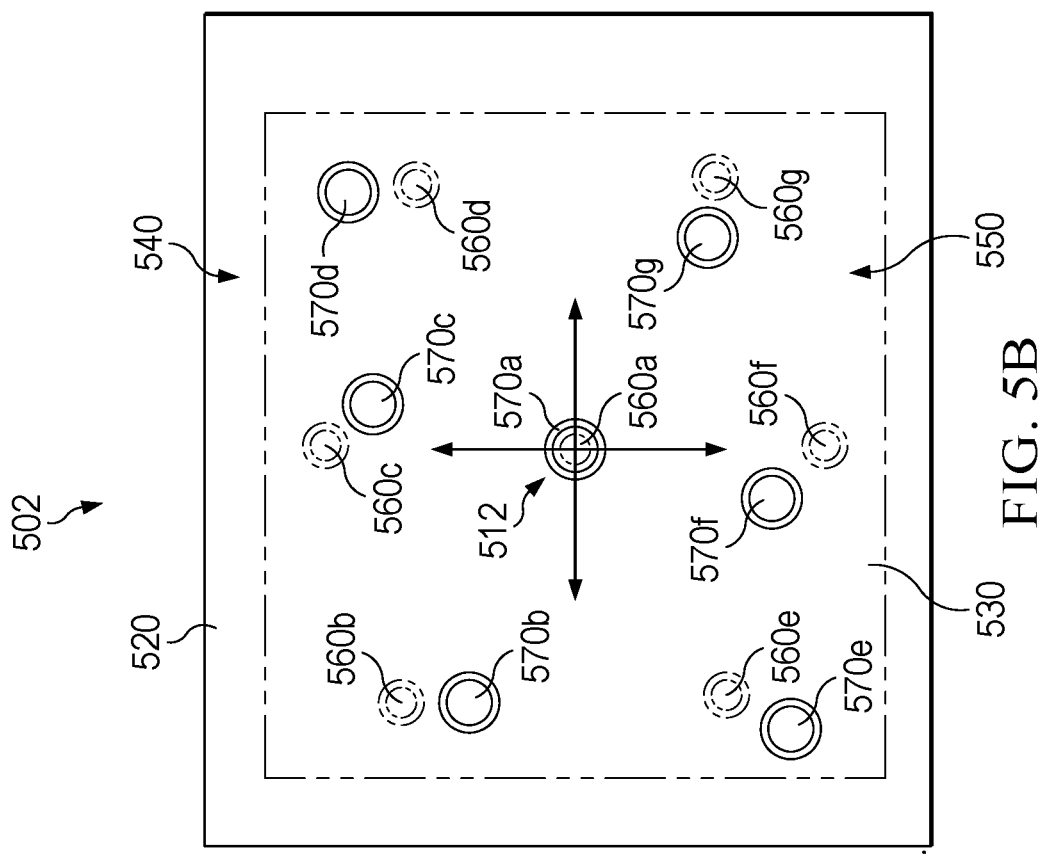
FIG. 5B illustrates the asymmetrical pattern of NISMSs on the two contact faces aligned within the system shown in FIG. 5A, viewed according to a point of view plane B-B.

FIG. 5A illustrates an example system 500 that includes an asymmetrical pattern 502 of NISMSs 510a-510g that detect a contact event with orthogonal translation-induced offset misalignment from parallel, according to this disclosure. FIG. 5B illustrates the asymmetrical pattern of NISMSs on the two contact faces aligned within the system shown in FIG. 5A, viewed according to a point of view plane B-B. FIGS. 5A and 5B are described together as FIG. 5. The system 500 includes at least one continuity NISMS 510A that includes a continuity sensing element 560a positioned on the first contact face 540 at a spatial location that is an origin point 512. The continuity NISMS 510A includes a continuity return element 570a positioned on the second contact face 550 at a spatial location that corresponds to (e.g., is centered about, and that overlaps) the origin point 512. When the two contact faces 540 and 550 physically contact in parallel alignment (without angular misalignment and without offset misalignment), the spatial locations of the continuity sensing element 560a and continuity return element 570a overlap at the origin 512 and electrically connect with each other as an aligned pair of elements. In a scenario where one or both contact faces (e.g., 540 and 550) are non-conducting, one or more aligned pair of elements can be applied to enable such continuity NISMS 510a to generate an electric signal as an indicator of a contact event at the origin 512.

To detect orthogonal translation-induced offset misalignment from parallel, the system 500 includes a plurality of NISMSs 510A-510G arranged such that fewer than all pairs of elements are able to create a conducting circuit upon face contact. For example, the NISMSs 510A-510G within the system 500 include a set of multiple sensing elements 560a-560g of an NISMS arranged in a first pattern 504 on the first contact face 540 of the first body 520, and a set of multiple corresponding return elements 570a-570g arranged on the second contact face 550 of the second body 530 in a second pattern 506 different from the first pattern 504, according to this disclosure. If the two parallel faces 540 and 550 shift orthogonally (e.g., in a direction shown by 2D axes 514) relative to the body translation vector 522 and 532, the sequence (e.g., set) of sensing elements that are conducting an electric signal will change, indicating a translation in the face plane. If the parallel faces 540 and 550 are aligned, as shown in FIG. 5, then the sensing elements 560b-560g and corresponding return elements 570b-570g that form the non-aligned pairs, respectively, will not overlap and will form an open switch that is not conducting an electric signal.

For example, if second contact face 550 shifts orthogonally (e.g., a positive z direction) such that the non-aligned pair of elements 560*b* and 570*b* overlaps at the spatial location of the second sensing element 560*b*, then the second NISMS 510*b* outputs an electrical signal that is an indicator of orthogonal translation-induced offset misalignment from parallel in the positive z direction. That is, the non-aligned pair of elements 560*b* and 570*b* electrically contact each other to conduct an electric signal between the first and second terminals of a power source. The orthogonal shift in the face plane does not disconnect the continuity NISMS 510*a*, which continues conducting an electrical signal that indicates parallel alignment.

Asymmetrical arrangements of sensing elements cause electric signal generation based on relative translation of faces 540 and 550. Resolution of the angle of misalignment and extent of face translation can be changed based on number and relative location of sensing element pairs.

Figure 6A:
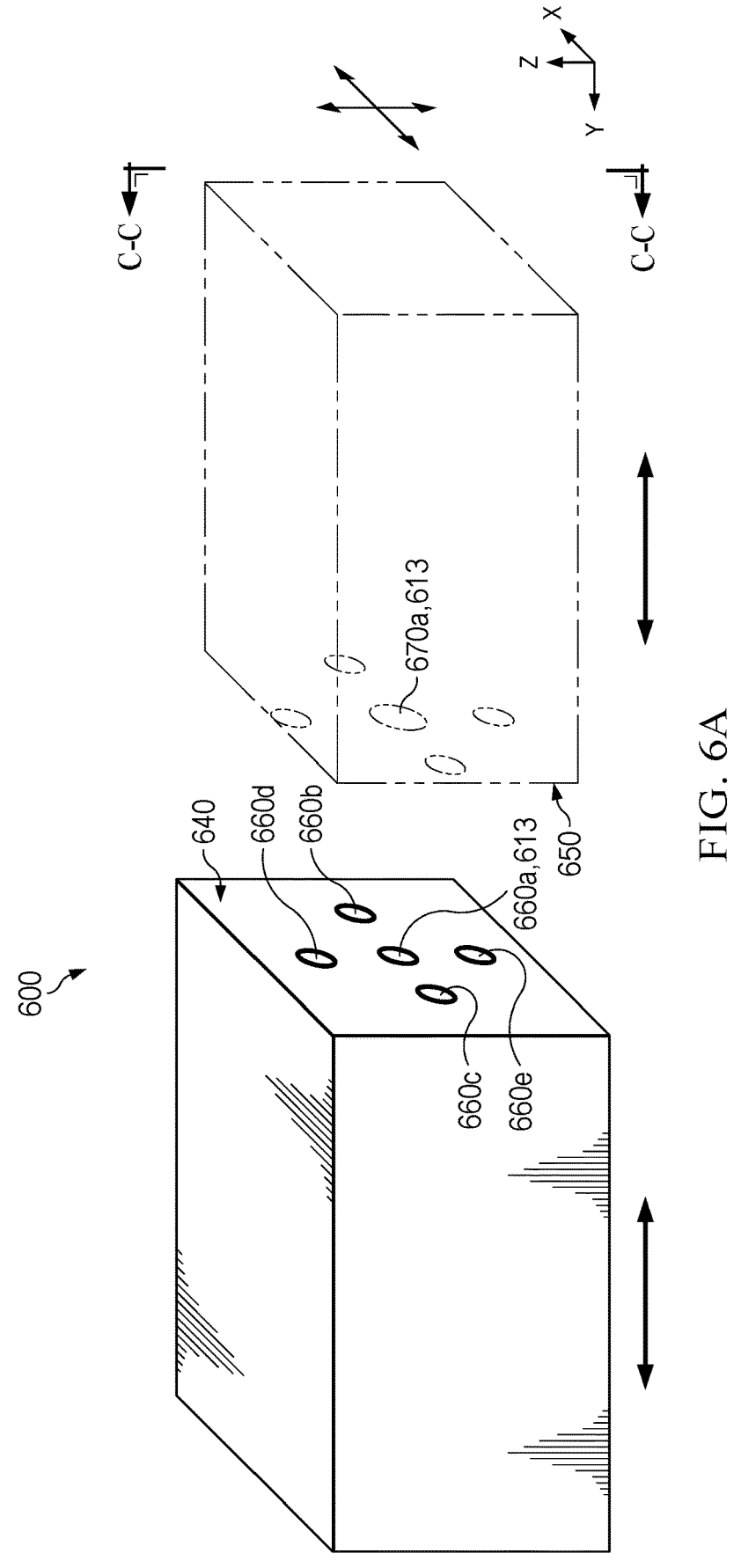
FIG. 6A illustrates an example system that includes a symmetrical pattern of an NISMS that detects a contact event and determines an orthogonal translation vector as a measurement of offset misalignment from parallel, according to this disclosure.
Figure 6B:
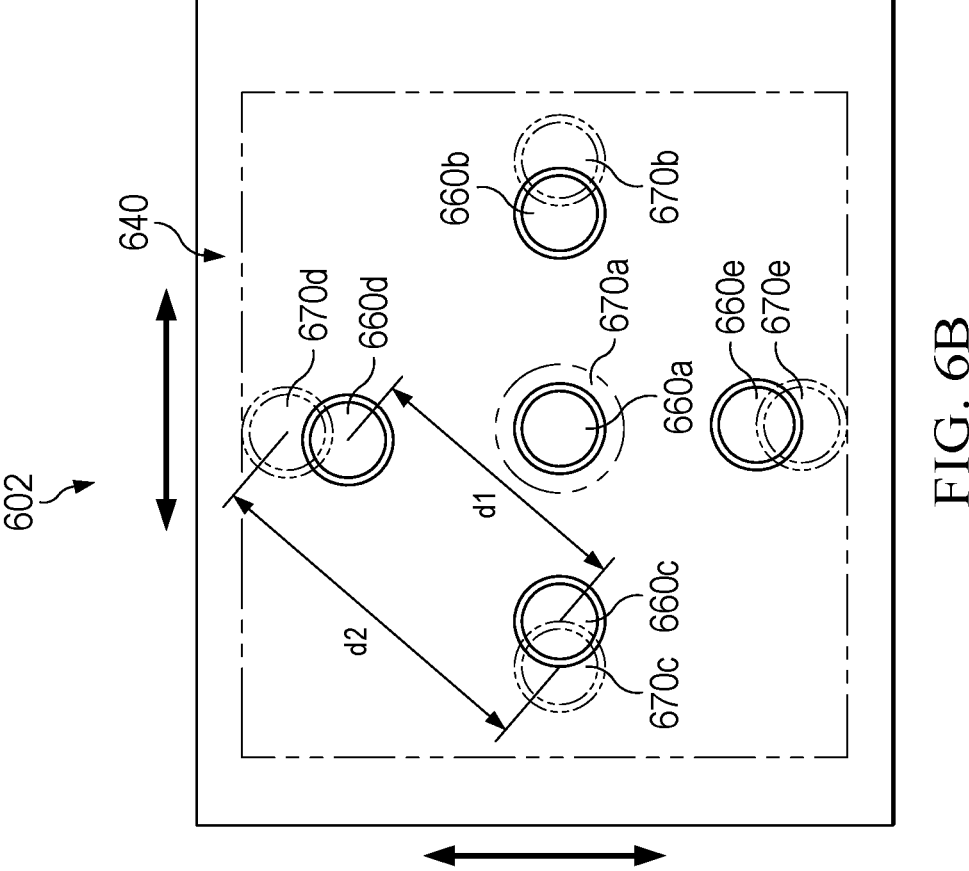
FIG. 6B illustrates the two contact faces aligned within the system shown in FIG. 6A, sharing the same geometric pattern of sensing elements with different element spacing dimensions, viewed according to a point of view plane C-C.

FIG. 6A illustrates an example system 600 that includes a symmetrical pattern of an NISMS that detects a contact event and determines an orthogonal translation vector as a measurement of offset misalignment from parallel, according to this disclosure. FIG. 6B illustrates the two contact faces aligned within the system shown in FIG. 6A, sharing the same geometric pattern of sensing elements with different element spacing dimensions, viewed according to a point of view plane C-C. FIGS. 6A and 6B are described together as FIG. 6. For example, the plurality of NISMSs 610*a*-610*e* includes a geometric pattern 602 of multiple sensing elements 660*a*-660*e* that mate with multiple corresponding return elements 670*a*-670*e* arranged in the same geometric pattern with a different element spacing dimension. For example, the spacing dimension of the sensing elements 660*a*-660*e* can be a first distance d1 between the sensing elements, and the spacing dimension of the return elements 670*a*-670*e* can be a second distance d2 between the return elements that is greater than the first distance d1.

For example, the geometric pattern 602 includes an array, which includes a first row, a second row, a first column, a second column, which can be similar to the array pattern in the system 400 of FIG. 4, and can be rotated (e.g., 45°). The geometric pattern 602 additionally includes a center point where an origin 612 of a continuity NISMS 610*a* (including an aligned pair of elements 660*a* and 670*b*) is located, for example, the geometric pattern 602 can resemble 5-points on a rolling-die, or can be referred to as a quincunx pattern. The diameters of the continuity pair of elements 660*a* and 670*b* can be different from each other, for example, the diameter of the first return element 670*a* can be greater than the diameter of the first sensing element 660*a*. The diameters of the arrayed sensing elements 660*b*-660*e* (other than the continuity pair at the origin 613), which form the rows and columns of the array of sensing elements, can be equivalent to each other. The diameters of the arrayed return elements 670*b*-670*e*, which form the rows and columns of the array of return elements, can be equivalent to each other, and can be the same as or different from the diameter of the arrayed sensing elements.

To determine an orthogonal translation vector, a specified partial overlap area of a cross sectional area of the arrayed sensing element 660*b*-660*e* partially overlaps and is in physical and electrical contact with a corresponding arrayed return element 670*b*-670*e* when the two contact faces 640 and 650 are parallel aligned and in physical contact. A reference resistance measurement or reference conductivity measurement can be defined based on the electrical signals generated by the set of arrayed NISMSs 610*b*-610*e* partially overlapping, in addition to the electrical signal from the overlap within the continuity NISMS 610*a* at the origin 613.

A translation vector can be determined based on the measured resistance at each NISMS element. The change in resistance measurement (R) is resultant from the changing cross-sectional area of the NISMS elements. For example, the change in resistance measurement (R) is relative to the reference resistance measurement and can be estimated based on Equation 1 below, where R denotes resistance, L denotes length of the material measured, and A denotes a cross-sectional area of the material overlapped.

$$R \approx L/A \tag{1}$$

In some embodiments, the continuity NISMS 610*a* maintains a constant (e.g., invariant to translation) contact area, which invariance can be used as a basis upon which to calibration or correct temperature induced resistance change.

Figure 7:
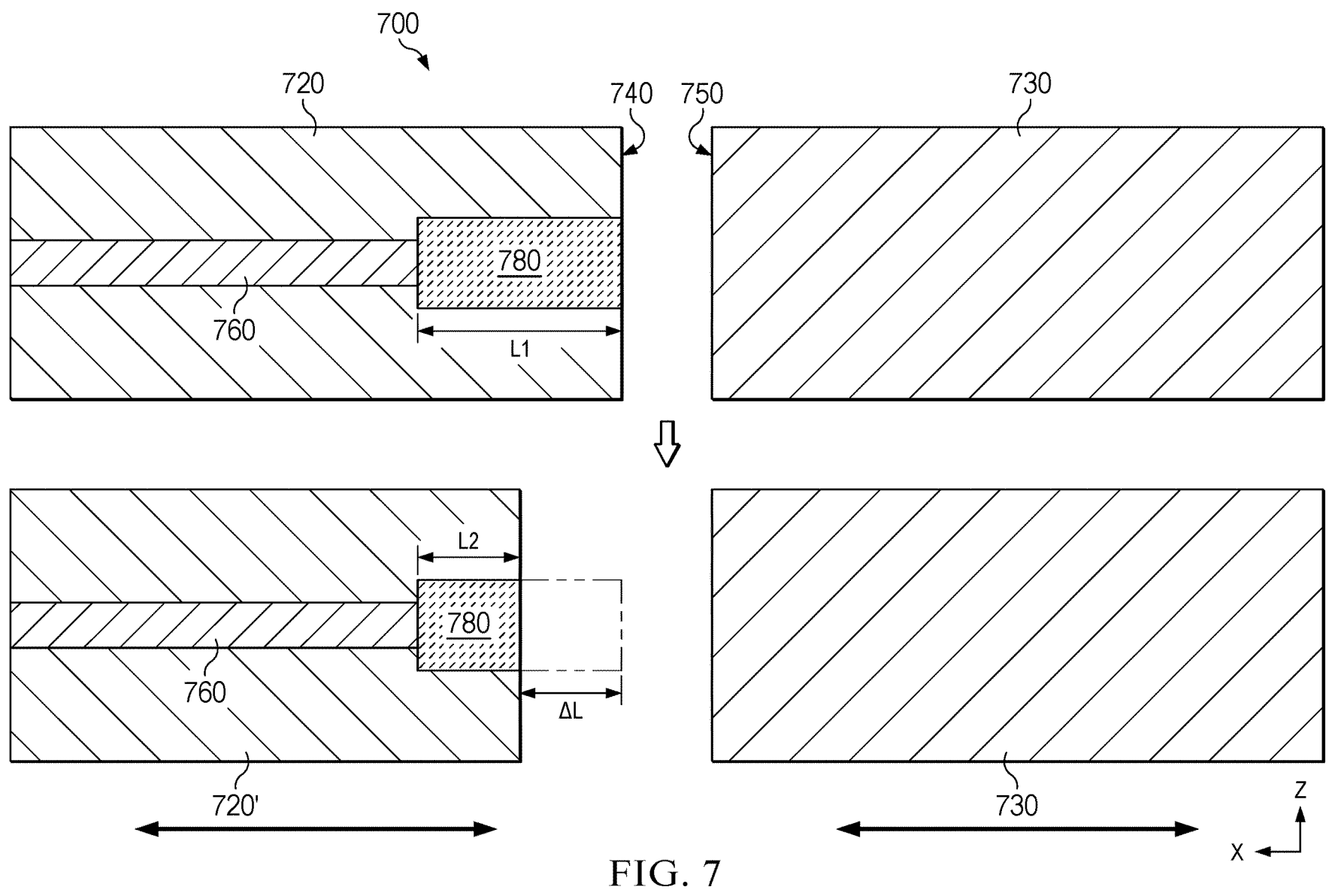

FIG. 7 illustrates a front view of a system 700 that includes a sensing element 760 and an abrasion sensing element 780 (also referred to as an abradable resistive element) of an NISMS that detects a contact event and face wear from a conductive second body, according to this disclosure. The abrasion sensing element 780 is composed of an abradable resistive material that reduces cross-sectional length (L) in response to abrasion from physical contact with the second body 730. The abradable resistive material can be carbon-ceramic composite, amorphous carbon, or other material. The second body 730 is composed of conductive material and can be the same as or similar to the second body 130 of FIG. 1. In some embodiments, the second body 730 can be composed of non-conductive material, in which case, a conducting return path can be provided for the second body similar to the return paths associated with the return elements 270*a*-270*c* of FIG. 2A.

When the second contact face 750 physically contacts the abrasion sensing element 780 at the first contact face 740, both contact and face wear (e.g., abrasion) can be determined. A length (L) of the abrasion sensing element 780 shortens due to abrasion from a previous length L1 to a current length L2. The change of length (ΔL) of the abrasion sensing element 780 represents a change of length of the first body 720 before face wear to a current length of the shortened first body 720′. The face wear is determined based on a change in resistance of the sensing element 760 that includes the abrasion sensing element 780. The change in resistance (ΔR) of the abrasion sensing element 780 also represents a change in resistance at the spatial location of the sensing element 760. The resistance measurement corresponding to the spatial location of the sensing element 760 can be estimated according to Equation 2, where the change of length (ΔL) of the abrasion sensing element 780 is determined based on L2 subtracted from L2, and where the cross sectional area of the abrasion sensing element 780 is denoted as A. In various embodiments of this disclosure, the cross sectional area of the abrasion sensing element 780 can be equivalent to or greater than the cross sectional area of a lead (composed of lead material) that forms part of the sensing element 760.

$$\Delta R \approx \Delta L/A \tag{2}$$

FIG. 8 illustrates a front view of a sensing element 860 and an abradable resistive element 780 of an NISMS that detects a contact event and face wear from a second body 830, according to this disclosure. That is, two contact faces 840 and 850 of the first body 830 and the second body 830 physically contact when the bodies exhibit movement in a direction normal to a face plane. The second body 830 is composed of conductive material and can be the same as or similar to the second body 130 of FIG. 1. For example, the second body 830 is composed of a conductive material, but is unable to support installation of return element onto the second contact face 850. In some embodiments, the second body 830 is unable to support a surface mounted return path installed onto another face of the second body 830, other than the second contact face 850. Installation of the NISMS 810 includes installing (via surface mounting, entrenching, embedding) a return element 870 (onto the first body 820 that also includes the sensing element 780 of FIG. 7 installed. The cross sectional area of the abrasion sensing element 780 can be greater than the cross sectional area of the sensing element 860 that is a lead, and can be greater than the cross sectional area of a second lead 870 that forms a return path 870. In some embodiments, the abradable resistive element 780, which is electrically coupled to both the return path 870 and to the path of the sensing element 860 lead, performs a similar function to both functions of a pair of aligned elements (e.g., 560a and 570a of FIG. 5). The shortened first body 820' can be shortened similar to the shortened first body 720' of FIG. 7.

Figure 9:
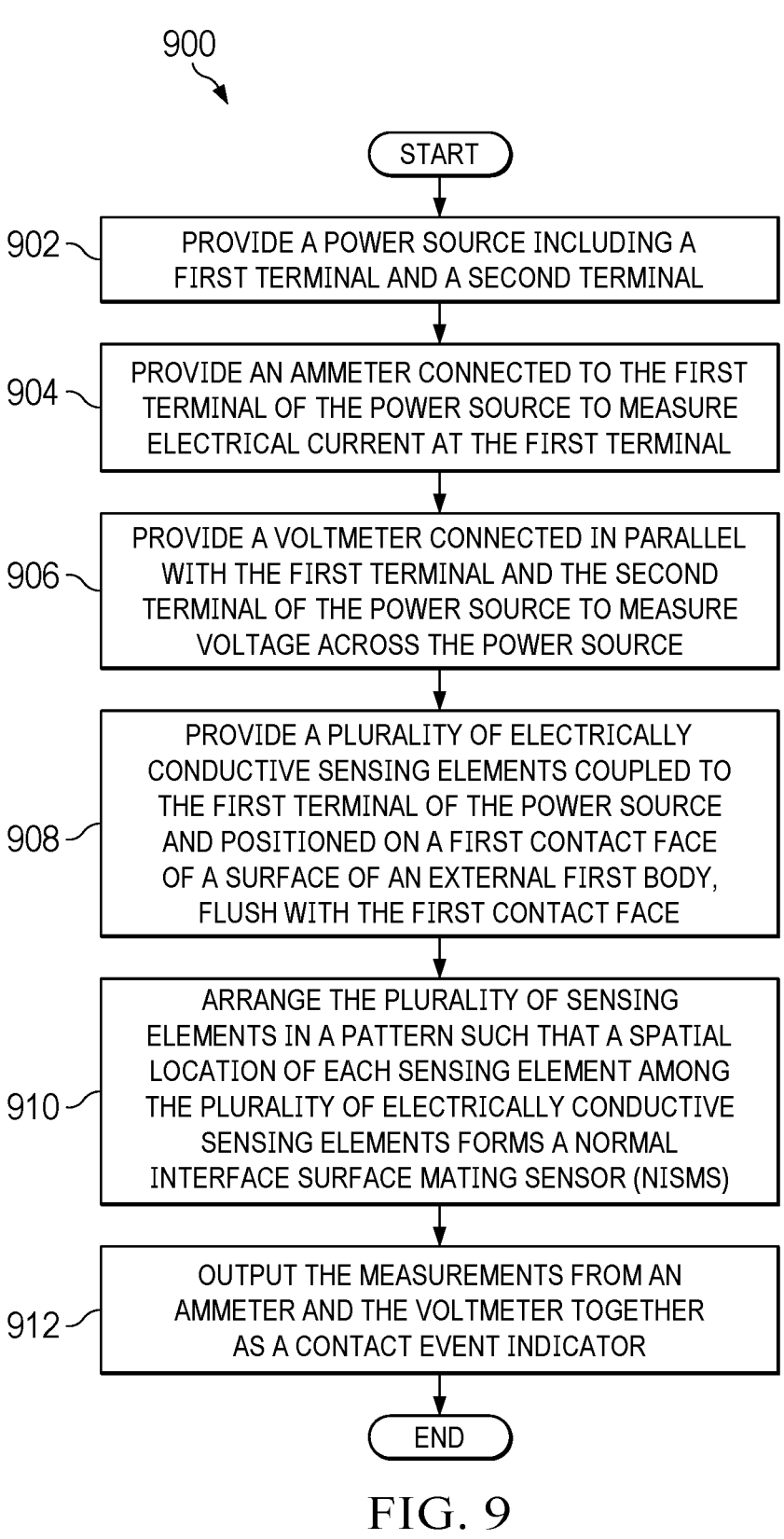
FIG. 9 illustrates an example method for using an NISMS according to this disclosure.

FIG. 9 illustrates an example method 900 for using a normal interface surface mating sensor according to this disclosure. The method 900 can be performed by a computer processor of automated manufacturing system that is configured to install an NISMS onto or embed an NISMS into a first body and/or the second body of FIGS. 1-8. The processor can use or control other components of the automated manufacturing system to perform the method 900, however, for simplicity, the method 900 is described as performed by the processor.

At block 902, the processor provides a power source including a first terminal and a second terminal. At block 904, the processor provides an ammeter connected to the first terminal of the power source to measure electrical current at the first terminal. At block 904, the processor provides a voltmeter connected in parallel with the first terminal and the second terminal of the power source to measure voltage across the power source.

At block 906, the processor provides a plurality of electrically conductive sensing elements coupled to the first terminal of the power source and positioned on a first contact face of a surface of an external first body, flush with the first contact face. The plurality of electrically conductive sensing elements is arranged in a pattern such that a spatial location of each sensing element among the plurality of electrically conductive sensing elements forms a normal interface surface mating sensor (NISMS) that generates an electrical signal when a conductive area on an opposing contact face of an external second body physically contacts the first contact face of the first body at the spatial location of the NISMS.

As part of providing the plurality of sensing elements, at block 908, the processor arranges the plurality of sensing elements in a pattern such that a spatial location of each sensing element among the plurality of electrically conductive sensing elements forms a normal interface surface mating sensor (NISMS). Each NISMS generates an electrical signal when a conductive area on an opposing contact face of an external second body physically contacts the first contact face of the first body at the spatial location of the NISMS.

At block 912, measurements from the ammeter and the voltmeter together are conveyed to an input interface of a processor that performs a function based on the received measurements. Particularly, the NISMSs that are conducting an electric signal (referred to as a sequence of NISMISs)

output measurements from the ammeter and the voltmeter together as a contact event indicator. The input interface of the processor receives the measurements output from the sequence of NISMSs as the contact event indicator, which includes a conductivity measurement corresponding to the electrical signal generated by the physical contact at a sequence of the NISMSs with the conductive area on opposing contact face.

Although FIG. 9 illustrates an example method 900 for using an NISMS, various changes may be made to FIG. 9. For example, while shown as a series of steps, various steps in FIG. 9 could overlap, occur in parallel, occur in a different order, or occur any number of times.

As a particular example, in some embodiments, the pattern includes an array including a first row, a second row, a first column, and a second column. The conductivity measurement corresponding to first and second NISMSs as the sequence of the NISMSs in the physical contact with the second body indicates angular misalignment about a first axis of rotation. The conductivity measurement corresponding to first and third NISMSs as the sequence of the NISMSs in the physical contact with the second body indicates angular misalignment about a second axis of rotation orthogonal to the first axis. The conductivity measurement corresponding to third and fourth NISMSs as the sequence of the NISMSs in the physical contact with the second body indicates angular misalignment about a third axis parallel to the first axis. The conductivity measurement corresponding to second and fourth NISMSs as the sequence of the NISMSs in the physical contact with the second body indicates angular misalignment about a fourth axis parallel to the third axis.

In some embodiments, the method 900 further comprises providing a set of return elements asymmetrically arranged in the pattern and positioned on the opposing contact face of the second body. The set of asymmetrically arranged return elements includes a continuity return element characterized by a wider diameter than non-aligned return elements among the set of return elements. The plurality of sensing elements is asymmetrically arranged in the pattern. When the opposing contact face physically contacts the first contact face, the continuity return element maintains electrical contact with a first continuity sensing element among the plurality of sensing elements while any non-aligned return element electrically contacts a corresponding non-aligned sensing element as a non-aligned pair. The contact event indicator output includes a first indicator of translation in a first direction along a first axis when a first non-aligned pair are contacting. The contact event indicator output includes a second indicator of translation in a second direction along the first axis when a second non-aligned pair are contacting, the first and second directions opposite to each other. The contact event indicator output includes a third indicator of translation in a third direction along a second axis orthogonal to the first axis when a third non-aligned pair are contacting. The contact event indicator output includes a fourth indicator of translation in a fourth direction along a fourth axis orthogonal to the second axis when a fourth non-aligned pair are contacting, the third and fourth directions opposite to each other. The embodiment could be further include the processor determining, based on the contact event indicator output, an angle of translation and distance of translation from an origin where the spatial locations of the continuity sensing element and the continuity return element overlap, based on: at least one of the first, second, third, or fourth indicators; and the origin relative the spatial locations of the sequence of the NISMSs among the non-aligned pairs contacting.

In some embodiments, the processor is further configured to provide an abrasion sensing element attached to at least one sensing element among the plurality of sensing elements. The abrasion sensing element is composed of an abradable resistive material that reduces cross-sectional length in response to abrasion from physical contact with the second body. The method can further include outputting (or conveying to the input interface of the processor) an abrasion indicator corresponding to a change of resistance of the sensing element relative to a reference resistance that defines whether threshold abrasion condition is satisfied. The abradable resistive material has a higher resistivity than a conductive material from which the at least one sensing element is composed.

In some embodiments, a change of the cross-sectional length of the abradable resistive material relative to a reference length causes a change to the conductivity measurement as a function of contact area between the at least one sensing element and a corresponding return sensor.

In some embodiments, a return element is positioned on the first contact face of the first body as the sensing element and coupled to the second terminal of the power source, wherein the second body is non-conductive. In some embodiments, an abrasion sensing element is attached to the sensing element and the return element on the first body.

In some embodiments, a least one sensing element among the plurality of sensing elements is entrenched into a grove of a second face of the first body that is different from the first contacting face of the first body. A portion of the at least one sensing element is exposed outside the first body.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a power source including a first terminal and a second terminal;
at least one of:
an ammeter connected to the first terminal of the power source to measure electrical current at the first terminal; or
a voltmeter connected in parallel with the first terminal and the second terminal of the power source to measure voltage across the power source;
a plurality of electrically conductive sensing elements is coupled to the first terminal of the power source and positioned on a first contact face of a surface of an external first body, flush with the first contact face, and arranged in a pattern such that a spatial location of each sensing element among the plurality of electrically conductive sensing elements forms a normal interface surface mating sensor (NISMS) that generates an electrical signal when a conductive area on an opposing contact face of an external second body physically contacts the first contact face of the external first body at the spatial location of the NISMS,
wherein measurements from the at least one of the ammeter or the voltmeter are output as a contact event indicator that includes a conductivity measurement corresponding to the electrical signal generated by the physical contact at a sequence of the NISMSs with the conductive area on opposing contact face; and
a set of return elements asymmetrically arranged in the pattern and positioned on the opposing contact face of the external second body, and including a continuity return element characterized by a wider diameter than non-aligned return elements among the set of return elements.

2. The apparatus of claim 1, wherein:
the pattern includes an array including a first row, a second row, a first column, and a second column; and
the conductivity measurement corresponding to first and second NISMSs as the sequence of the NISMSs in the physical contact with the external second body indicates angular misalignment about a first axis of rotation;
the conductivity measurement corresponding to first and third NISMSs as the sequence of the NISMSs in the physical contact with the external second body indicates angular misalignment about a second axis of rotation orthogonal to the first axis of rotation;
the conductivity measurement corresponding to third and fourth NISMSs as the sequence of the NISMSs in the physical contact with the external second body indicates angular misalignment about a third axis parallel to the first axis of rotation; and
the conductivity measurement corresponding to second and fourth NISMSs as the sequence of the NISMSs in the physical contact with the external second body indicates angular misalignment about a fourth axis parallel to the third axis.

3. The apparatus of claim 1, wherein:

the plurality of electrically conductive sensing elements is asymmetrically arranged in the pattern;

wherein when the opposing contact face physically contacts the first contact face, the continuity return element maintains electrical contact with a first continuity sensing element among the plurality of electrically conductive sensing elements while any non-aligned return element electrically contacts a corresponding non-aligned sensing element as a non-aligned pair;

the contact event indicator output includes a first indicator of translation in a first direction along a first axis when a first non-aligned pair are contacting;

the contact event indicator output includes a second indicator of translation in a second direction along the first axis when a second non-aligned pair are contacting, the first and second directions opposite to each other;

the contact event indicator output includes a third indicator of translation in a third direction along a second axis orthogonal to the first axis when a third non-aligned pair are contacting; and the contact event indicator output includes a fourth indicator of translation in a fourth direction along a fourth axis orthogonal to the second axis when a fourth non-aligned pair are contacting, the third and fourth directions opposite to each other.

4. The apparatus of claim 3, wherein contact event indicator output is used to determine an angle of translation and distance of translation from an origin where the spatial locations of the first continuity sensing element and the continuity return element overlap, based on:

at least one of the first, second, third, or fourth indicators; and the origin relative the spatial locations of the sequence of the NISMSs among the non-aligned pairs contacting.

5. The apparatus of claim 1, further comprising an abrasion sensing element attached to at least one sensing element among the plurality of electrically conductive sensing elements, where the abrasion sensing element is composed of an abradable resistive material that reduces cross-sectional length in response to abrasion from physical contact with the external second body, wherein the contact event indicator output includes an abrasion indicator corresponding to a change of resistance of the sensing element relative to a reference resistance.

6. The apparatus of claim 5, wherein the abradable resistive material has a higher resistivity than a conductive material from which the at least one sensing element is composed.

7. The apparatus of claim 5, wherein a change of the cross-sectional length of the abradable resistive material relative to a reference length causes a change to the conductivity measurement as a function of contact area between the at least one sensing element and a corresponding return sensor.

8. The apparatus of claim 1, further comprising a return element positioned on the first contact face of the external first body as the sensing element and coupled to the second terminal of the power source, wherein the external second body is non-conductive.

9. The apparatus of claim 8, further comprising an abrasion sensing element attached to the sensing element and the return element on the external first body.

10. The apparatus of claim 1, wherein at least one sensing element among the plurality of electrically conductive sensing elements is entrenched into a grove of a second face of the external first body that is different from the first contacting face of the external first body, wherein a portion of the at least one sensing element is exposed outside the external first body.

11. A method comprising:

providing a power source including a first terminal and a second terminal;

providing at least one of:

an ammeter connected to the first terminal of the power source to measure electrical current at the first terminal; or a voltmeter connected in parallel with the first terminal and the second terminal of the power source to measure voltage across the power source;

providing a plurality of electrically conductive sensing elements coupled to the first terminal of the power source and positioned on a first contact face of a surface of an external first body, flush with the first contact face, and are arranged in a pattern such that a spatial location of each sensing element among the plurality of electrically conductive sensing elements forms a normal interface surface mating sensor (NISMS) that generates an electrical signal when a conductive area on an opposing contact face of an external second body physically contacts the first contact face of the first body at the spatial location of the NISMS;

outputting measurements from the provided at least one of the ammeter or the voltmeter as a contact event indicator that includes a conductivity measurement corresponding to the electrical signal generated by the physical at a sequence of the NISMSs with the conductive area on opposing contact face; and providing a set of return elements asymmetrically arranged in the pattern and positioned on the opposing contact face of the external second body, and including a continuity return element characterized by a wider diameter than non-aligned return elements among the set of return elements.

12. The method of claim 11, wherein:

the pattern includes an array including a first row, a second row, a first column, and a second column; and the conductivity measurement corresponding to first and second NISMSs as the sequence of the NISMSs in the physical contact with the external second body indicates angular misalignment about a first axis of rotation;

the conductivity measurement corresponding to first and third NISMSs as the sequence of the NISMSs in the physical contact with the external second body indicates angular misalignment about a second axis of rotation orthogonal to the first axis;

the conductivity measurement corresponding to third and fourth NISMSs as the sequence of the NISMSs in the physical contact with the external second body indicates angular misalignment about a third axis parallel to the first axis; and the conductivity measurement corresponding to second and fourth NISMSs as the sequence of the NISMSs in the physical contact with the external second body indicates angular misalignment about a fourth axis parallel to the third axis.

13. The method of claim 11, wherein:

the plurality of electrically conductive sensing elements is asymmetrically arranged in the pattern;

wherein when the opposing contact face physically contacts the first contact face, the continuity return element maintains electrical contact with a first continuity sensing element among the plurality of electrically conductive sensing elements while any non-aligned return element electrically contacts a corresponding non-aligned sensing element as a non-aligned pair;

the contact event indicator output includes a first indicator of translation in a first direction along a first axis when a first non-aligned pair are contacting;

the contact event indicator output includes a second indicator of translation in a second direction along the first axis when a second non-aligned pair are contacting, the first and second directions opposite to each other;

the contact event indicator output includes a third indicator of translation in a third direction along a second axis orthogonal to the first axis when a third non-aligned pair are contacting; and the contact event indicator output includes a fourth indicator of translation in a fourth direction along a fourth axis orthogonal to the second axis when a fourth non-aligned pair are contacting, the third and fourth directions opposite to each other.

14. The method of claim 13, further comprising:

determining, based on the contact event indicator output, an angle of translation and distance of translation from an origin where the spatial locations of the first continuity sensing element and the continuity return element overlap, based on:

at least one of the first, second, third, or fourth indicators; and the origin relative the spatial locations of the sequence of the NISMSs among the non-aligned pairs contacting.

15. The method of claim 11, further comprising:

providing an abrasion sensing element attached to at least one sensing element among the plurality of electrically conductive sensing elements, where the abrasion sensing element is composed of an abradable resistive material that reduces cross-sectional length in response to abrasion from physical contact with the external second body, wherein outputting the contact event indicator includes outputting 1 an abrasion indicator corresponding to a change of resistance of the sensing element relative to a reference resistance.

16. The method of claim 15, wherein the abradable resistive material has a higher resistivity than a conductive material from which the at least one sensing element is composed.

17. The method of claim 15, wherein a change of the cross-sectional length of the abradable resistive material relative to a reference length causes a change to the conductivity measurement as a function of contact area between the at least one sensing element and a corresponding return sensor.

18. The method of claim 11, further comprising a return element positioned on the first contact face of the first body as the sensing element and coupled to the second terminal of the power source, wherein the external second body is non-conductive.

19. The method of claim 18, further comprising an abrasion sensing element attached to the sensing element and the return element on the first body.

20. The method of claim 11, wherein at least one sensing element among the plurality of electrically conductive sensing elements is entrenched into a grove of a second face of the first body that is different from the first contacting face of the first body, wherein a portion of the least one sensing element is exposed outside the first body.

* * * * *